Dec. 9, 1958   P. TURNER   2,863,273
MOWER ATTACHMENT
Filed March 12, 1956   2 Sheets-Sheet 2

INVENTOR.
Peter Turner
BY
ATTORNEY

_2,863,273_
_Patented Dec. 9, 1958_

2,863,273

MOWER ATTACHMENT

Peter Turner, Spokane, Wash.

Application March 12, 1956, Serial No. 570,854

5 Claims. (Cl. 56—25)

This invention relates to improvements in implements and particularly to a mower attachment for tractors, the primary object being to associate a cutter bar and sickle assembly with lifting structure in a novel manner to permit operable positioning of the assembly in accordance with weeds, crops or the like to be cut under direct control of the operator with ease and facility.

It is the most important object of the present invention to provide a lifting structure adapted for attachment to a tractor and having thereon a cutter bar and sickle assembly that in turn is adjustable with respect to the lifting structure so that precise adjustments in height and attitude can be made.

Another important object of the present invention is to provide in combination with lifting structure, power means for adjusting the cutter bar and sickle assembly to the end that the position of the latter relative to the lift structure may be regulated in accordance with the height of the assembly as selected by the operator of the tractor.

Other objects include important details of construction to be made clear as the following specification progresses, reference being had to the accompanying drawings, wherein:

Fig. 4 is a fragmentary, cross-sectional view taken on line IV—IV of Fig. 5; and Fig. 5 is a fragmentary, front elevational view, parts being broken away for clearness.

Figure 1:
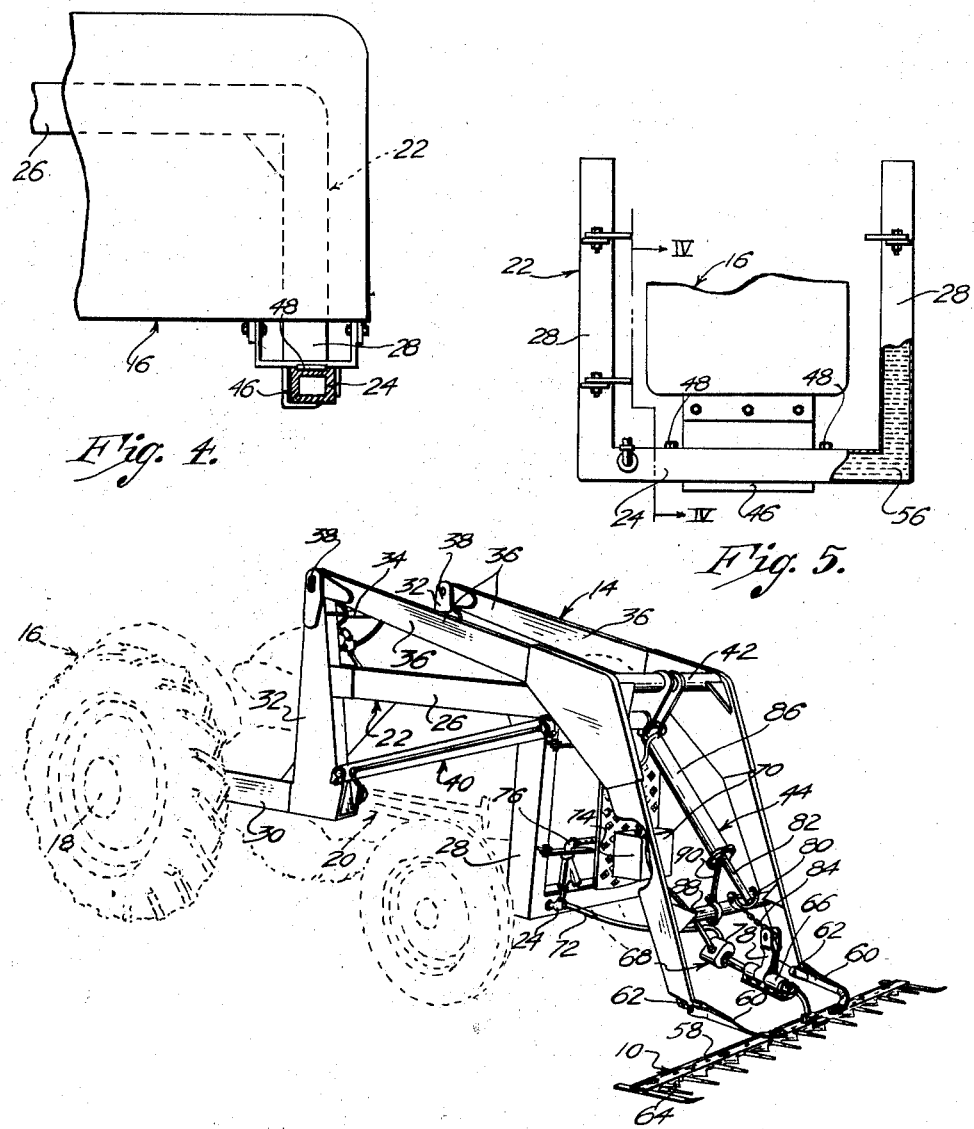
Figure 1 is a perspective view of a mower attachment showing the same operably mounted on a tractor.
Figure 3:
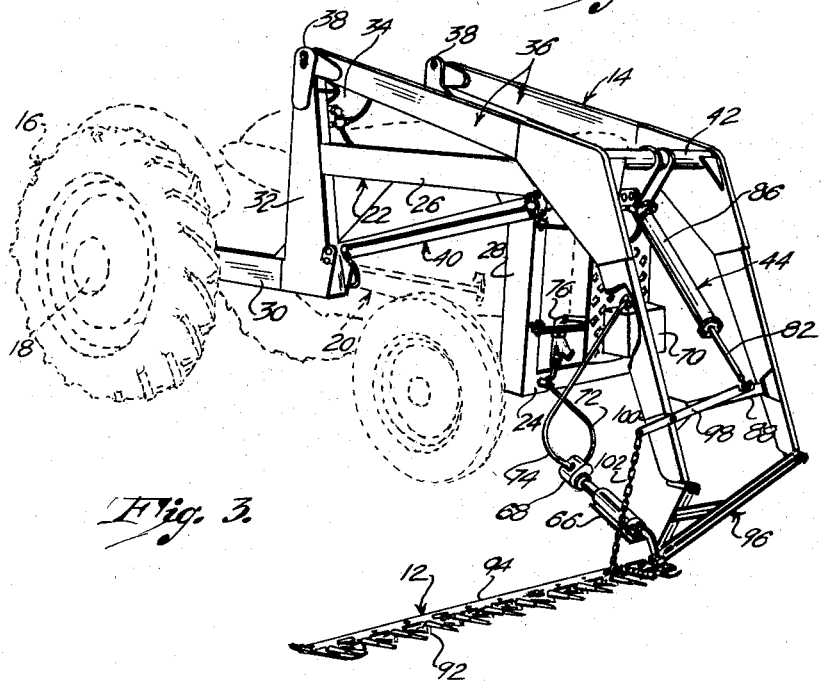
Fig. 3 is a perspective view similar to Fig. 1 illustrating the modified form of the invention.

The attachments of the two forms of the instant invention shown in Figs. 1 and 3 respectively, are identical except only for the cutter bar and sickle assemblies 10 and 12 respectively, and the way in which the same are operably mounted on the lifting structure. Such lifting structure is broadly designated by the numeral 14 and is shown operably mounted on a tractor 16 having a rear axle assembly 18 and a main carriage 20.

Figure 2:
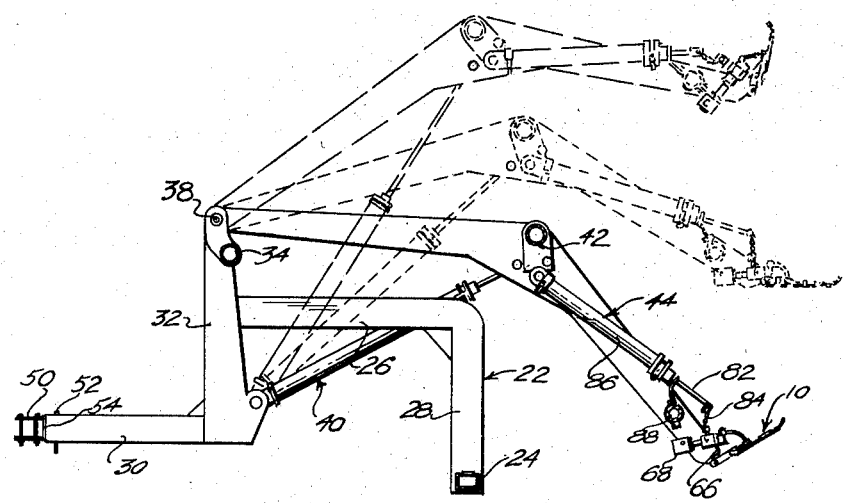
Fig. 2 is an elevation view, with parts broken away and shown in section of the attachment showing the same entirely removed from the tractor and illustrating various positions of the lifting structure and the mower attachment thereon.

The attachment shown removed from the tractor 16 in Fig. 2 of the drawings includes a frame broadly designated by the numeral 22 having a pair of identical assemblies, one on each side of the tractor 16, interconnected by a cross member 24 transversing the front of the tractor 16. Each of the assemblies 22 includes an L-shaped portion of a forwardly-extending, horizontal leg 26 and a downwardly-extending, vertical leg 28, the latter of which legs are interconnected at their lowermost ends by the cross member 24. Each assembly 22 includes additionally, another L-shaped portion having a rearwardly-extending thrust beam 30 and an upwardly-extending standard 32, the standards 32 being tied together by a cross element 34 at their uppermost ends.

A pair of spaced, angular lifting arms 36 swingably mounted on the uppermost ends of the standards 32 by pivot pins 38, pivotally support the corresponding mower assemblies 10 and 12 respectively. Double-acting hydraulic piston-cylinder assemblies 40 pivotally interconnect each arm 36 respectively intermediate the ends of the latter with a corresponding standard 32 adjacent the lowermost ends of the latter.

It is obvious that as the assemblies 40 are extended and retracted, the arms 36 and, therefore, the mower attachments 10 and 12, are raised and lowered as seen best in Fig. 2 of the drawings. A second cross element 42 interconnecting the arms 36, receives one end of a single double-acting piston and cylinder assembly 44 that operably interconnects the cross element 42 with the corresponding mower attachment 10 or 12 as the case may be. It is understood that the weight of the lifting structure, as well as the mower attachment, may make it possible to use single-acting hydraulic piston-cylinder assemblies throughout, if desired.

A hanger-type bracket 46 that is L-shaped in cross section, as shown in Fig. 4, is used to mount the attachment on the tractor 16 at the forwardmost end of the latter. Bracket 46 is mounted directly on the main carriage 20 of tractor 16 and faces forwardly to receive the cross member 24 in cradling relationship thereto, and to the end that the cross member 24 is centered properly, a pair of stops 48 are provided on the cross member 24 to receive the bracket 46.

The rearmost end of the attachment is releasably secured to the tractor 16 in the manner best seen in Fig. 2 of the drawings. A clamp-type of bracket 50 is provided for each thrust beam 30 respectively and each bracket 50 is secured rigidly to the axle assembly 16.

All of the parts of the frame assemblies 22 are preferably tubular and, therefore, the brackets 50 are provided with forward extensions (not shown) that are telescopically received by the rearmost ends of the thrust beams 30. A coupling pin 52 traversing the said extensions and the tubular beams 30, provide a simple and quick means of attachment.

To the end that the pins 52 are protected against shearing during use of the implement, brackets 50 are provided with abutments 54 that receive the rearmost ends of the thrust beams 30 as seen in Fig. 2. The hollow nature of the frame assemblies 22 is advantageous further as shown in Fig. 5, since the same may thereby be used as a receiver for hydraulic fluid 56 used to operate the extensible assemblies 40 and 44.

It is now seen that the entire thrust of the frame assemblies 22 is absorbed by rigid structure on the tractor 16 since the cross member 24 is cradled snugly within the hanger bracket 46 and the rearmost ends of the thrust beams 30 bear against the abutments 54. The cross member 24, as well as the thrust beams 30, are easily and quickly slipped into place and removed without need of tools or use of any other means of attachment such as bolts, brackets and other fasteners.

In the embodiment of my invention shown in Fig. 1, cutter bar 58 of assembly 10, is provided with a pair of arms 60 rigidly secured to cutter bar 58 and extending rearwardly therefrom. Pivot pins 62 pivotally mount the arms 60 to the forwardmost and normally lowermost ends of the lifting arms 36 for swinging movement of the assembly 10 about a horizontal axis traversing the normal path of travel of the tractor 16 and in parallelism with the axes of swinging movement of the lifting arms 36 about pivot means 38.

The manner of operating sickle 64 forming a part of the assembly 10 and reciprocably carried by the cutter bar 58, forms no part of the instant invention and may be similar to the disclosure of my U. S. Letters Patent No. 2,468,313, issued April 26, 1949. The disclosure of said patent, as well as U. S. Letters Patent No. 391,069, issued to George J. Parham on October 16, 1888, are incorporated herein by reference for a full understanding of the manner of driving sickle 64 through a drive unit broadly designated by the numeral 66. As seen in the aforementioned patents, unit 66 is provided with a rotatable drive shaft (not shown) and in accordance with the instant invention, such shaft is driven by a hydraulic motor 68 that is in turn coupled with a hydraulic pump 70 by flexible lines 72. A tubular connection 76 between pump 70 and cross member 24 supplies fluid 56 to the pump 70.

The unit 66 and, therefore, the motor 68 carried thereby, are coupled with the power unit 44 by means of bracket 78 rigid to the units 66 and extending upwardly therefrom, a clevis 80 pivotally secured to the outermost end of piston rod 82 forming a part of assembly 44, and a chain 84 interconnecting clevis 80 and bracket 78. Cylinder 86 of the assembly 44 is carried by a cross beam 88 interconnecting arms 36 and a bracket 90 extending upwardly from the cross beam 88 intermediate the ends of the latter.

In Fig. 3 of the drawings the cutter assembly 28 is shown extending laterally to one side of the lifting arms 36, it being understood that the assembly 28 may extend in either direction to suit the desires of the manufacturer. Unit 66 operably connects with sickle 92 of assembly 12 at one end of sickle 92 rather than intermediate the ends thereof as in the embodiment shown in Fig. 1. The innermost end of cutter bar 94 forming a part of the assembly 12 is swingably mounted on arm means 96 for movement about a horizontal axis parallel with the normal path of travel of the tractor 16. The manner of so pivotally mounting the sickle bar 94 on the arm means 96, forms no part of the instant invention and has, therefore, not been illustrated. In this respect also, any conventional means may be utilized to yieldably hold the assembly 12 in the position shown in Fig. 3 extending outwardly at right angles to the lifting arms 36, but swingable rearwardly upon encountering an obstacle that would otherwise cause damage to the mower unit.

The arm means 96 is secured rigidly to the foremost and normally lowermost ends of the arms 36 and cutter bar 94 is raised to an inoperable, vertical position by actuation of the power means 44. To this end piston rod 82 is pivotally connected at its outermost end to an arm or lever 98 that is swingable on one of the arms 36 by virtue of a pivot pin 100. The outermost end of the arm 98 connects with the cutter bar 94 by a chain 102.

Fig. 2 of the drawings illustrates diagrammatically the way in which the position of the assembly 10 may be adjusted with respect to the arms 36 and independently of the position of the latter by actuation of the power means 44. In this respect, as the arms 36 are gradually raised through operation of the power means 40 therefor, the assembly 10 may be gradually brought back to a horizontal position by extension of the piston stem 82. Although not illustrated, the sickle bar 94 may also be raised and lowered independently of the arms 36 as the height of the latter is varied through use of power means 40.

Having thus described the invention what is claimed as new and desired to be secured by Letters Patent is:

1. In combination with a tractor having a frame; lifting structure having a rearmost end pivotally mounted on said frame for swinging movement about a horizontal axis traversing the normal path of travel of the tractor, and a forwardmost end normally disposed forwardly of said tractor; power means interconnecting said frame and said lifting structure for swinging the latter; a cutter bar and sickle assembly disposed forwardly of said forwardmost end of the lifting structure; means mounting the assembly on said structure for swinging movement about an axis parallel with said horizontal axis; and power means including a reciprocable element, said power means being carried by the lifting structure for swinging movement therewith; and flexible, substantially non-extensible means interconnecting said element and said assembly for swinging the latter relative to the lifting structure.

2. In combination with a tractor having a frame; lifting structure having a rearmost end pivotally mounted on said frame for swinging movement about a horizontal axis traversing the normal path of travel of the tractor, and a forwardmost end normally disposed forwardly of said tractor; power means interconnecting said frame and said lifting structure for swinging the latter; a cutter bar and sickle assembly disposed forwardly of said forwardmost end of the lifting structure; arm means secured to the cutter bar of said assembly intermediate the ends thereof and extending rearwardly therefrom; means mounting the arm means on said structure for swinging movement about an axis parallel with said horizontal axis; and power means including a reciprocable element, said power means being carried by the lifting structure for swinging movement therewith; and flexible, substantially non-extensible means interconnecting said element and said assembly for swinging the latter relative to the lifting structure.

3. In combination with a tractor having a chassis; lifting structure including a frame detachably mounted on said chassis, a pair of lifting arms having rearmost ends pivotally secured to the frame intermediate the ends of the tractor for vertical swinging of the arms relative to the frame, said arms having forwardmost ends normally disposed forwardly of the tractor adjacent the ground, and a power unit including hydraulic piston and cylinder means interconnecting the frame and the arms for swinging the latter, and a hydraulic pump operably coupled with said piston and cylinder means; a mower attachment including a normally horizontal cutter bar and sickle assembly, pivot means detachably mounting said assembly on the arms at said forwardmost ends of the latter for vertical swinging movement relative thereto, and a drive unit carried by the assembly and operably connected with the sickle thereof, said drive unit including a hydraulic motor; a normally inclined hydraulic piston and cylinder control means carried by the arms therebetween and normally disposed forwardly of the tractor; a flexible connection between said control means and said assembly for swinging the latter relative to the arms upon actuation of said control means; and means operably coupling said pump with said motor and with said control means.

4. In combination with a tractor having a chassis; lifting structure including a frame detachably mounted on said chassis, a pair of lifting arms having rearmost ends pivotally secured to the frame intermediate the ends of the tractor for vertical swinging of the arms relative to the frame, said arms having forwardmost ends normally disposed forwardly of the tractor adjacent the ground, and a power unit including hydraulic piston and cylinder means interconnecting the frame and the arms for swinging the latter, and a hydraulic pump operably coupled with said piston and cylinder means; a mower attachment including a normally horizontal cutter bar and sickle assembly disposed forwardly of the arms, pivot means detachably mounting said assembly on the arms at said forwardmost ends of the latter for vertical swinging movement relative thereto about a horizontal axis substantially parallel with the axis of swinging movement of the arms, and a drive unit carried by the assembly and operably connected with the sickle thereof, said drive unit including a hydraulic motor; a normally inclined hydraulic piston and cylinder control means carried by the arms therebetween and normally disposed forwardly of the tractor; a flexible connection between said control means and said drive unit for swinging the assembly relative to the arms upon actuation of said control means; and means operably coupling said pump with said motor and with said control means.

5. In combination with a tractor having a chassis; lifting structure including a frame detachably mounted on said chassis, a pair of lifting arms having rearmost ends pivotally secured to the frame intermediate the ends of the tractor for vertical swinging of the arms relative to the frame, said arms having forwardmost ends normally disposed forwardly of the tractor adjacent the ground, and a power unit including hydraulic piston and cylinder means interconnecting the frame and the arms for swinging the latter, and a hydraulic pump operably coupled with said piston and cylinder means; a mower attachment including a normally horizontal cutter bar and sickle assembly extending laterally from said arms, pivot means detachably mounting said assembly on the arms at said forwardmost ends of the latter for vertical swinging movement relative thereto about a horizontal axis substantially perpendicular to the axis of swinging movement of the arms, and a drive unit carried by the assembly and operably connected with the sickle thereof, said drive unit including a hydraulic motor; a normally inclined hydraulic piston and cylinder control means carried by the arms therebetween and normally disposed forwardly of the tractor; a flexible connection between said control means and said cutter bar for swinging the assembly relative to the arms upon actuation of said control means; and means operably coupling said pump with said motor and with said control means.

References Cited in the file of this patent

UNITED STATES PATENTS

| | | |
|---|---|---|
| 1,533,492 | Zanon | Apr. 14, 1925 |
| 1,628,038 | Draper | May 10, 1927 |
| 2,120,671 | Jensen et al. | June 14, 1938 |
| 2,143,473 | Brown | Jan. 10, 1939 |
| 2,251,378 | Simpson | Aug. 5, 1941 |
| 2,285,117 | Johnson et al. | June 2, 1942 |
| 2,413,873 | Hume | Jan. 7, 1947 |
| 2,485,383 | Hoyt | Oct. 18, 1949 |
| 2,496,469 | Hilblom | Feb. 7, 1950 |
| 2,519,659 | Jahde | Aug. 22, 1950 |
| 2,589,553 | Kesselring | Mar. 18, 1952 |
| 2,629,219 | Hooley | Feb. 24, 1953 |
| 2,687,606 | Greer et al. | Aug. 31, 1954 |